United States Patent
De Waal (10) Patent No.: US 7,593,025 B1
(45) Date of Patent: Sep. 22, 2009

(54) ACCELERATED ROTATION FOR DISPLAYING AN IMAGE

(75) Inventor: Abraham B. De Waal, San Jose, CA (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 11/952,994

(22) Filed: Dec. 7, 2007

Related U.S. Application Data (62) Division of application No. 10/232,067, filed on Aug. 29, 2002.

(51) Int. Cl.
*G09G 5/00* (2006.01)

(52) U.S. Cl. .................. 345/649; 345/158; 345/552; 345/582; 345/656; 345/672; 382/296; 382/297; 715/863

(58) Field of Classification Search .......... 345/656–659
See application file for complete search history.

(56) References Cited

U.S. PATENT DOCUMENTS

| | | | |
|---|---|---|---|
| 5,369,737 A | 11/1994 | Gholizadeh et al. | |
| 5,781,165 A | 7/1998 | Tabata et al. | |
| 5,854,641 A * | 12/1998 | Howard et al. | 345/571 |
| 5,917,469 A | 6/1999 | Matsushita | |
| 5,973,664 A * | 10/1999 | Badger | 345/659 |
| 5,995,111 A | 11/1999 | Morioka et al. | |
| 6,126,544 A | 10/2000 | Kojima | |
| 6,137,468 A * | 10/2000 | Martinez et al. | 345/649 |
| 6,215,915 B1 | 4/2001 | Reyzin | |
| 6,356,271 B1 | 3/2002 | Reiter et al. | |
| 6,511,185 B1 | 1/2003 | Gananathan | |
| 6,532,013 B1 | 3/2003 | Papakipos et al. | |
| 6,639,603 B1 * | 10/2003 | Ishii | 345/568 |
| 6,847,385 B1 | 1/2005 | Garritsen | |
| 7,034,828 B1 | 4/2006 | Drebin et al. | |
| 7,215,344 B2 | 5/2007 | Baldwin | |
| 2002/0101439 A1* | 8/2002 | Mamona et al. | 345/649 |
| 2002/0180741 A1 | 12/2002 | Fowler et al. | |

* cited by examiner

*Primary Examiner*—Antonio A Caschera
(74) *Attorney, Agent, or Firm*—Patterson & Sheridan, LLP (57) ABSTRACT

A transform engine is configured to rotate, and/or rotate and translate, one or more polygons in response to screen orientation. Thus, when texture, obtained from a pre-rotated image is applied to a rotated polygon used to render such an image, a rotated version of such an image is generated in response to screen orientation. Alternatively, a user may select a rotation to re-orient an image to a screen view position.

11 Claims, 6 Drawing Sheets

ACCELERATED ROTATION FOR DISPLAYING AN IMAGE

CROSS-REFERENCE TO RELATED APPLICATIONS

This application is a divisional of co-pending U.S. patent application Ser. No. 10/232,067, filed Aug. 29, 2002, which is herein incorporated by reference.

FIELD OF THE INVENTION

The present invention generally relate to computer graphics, and more particularly to an accelerated mode for displaying a rotated image.

BACKGROUND OF THE INVENTION

A graphics processor unit is conventionally coupled to memory. This memory may be used as a frame buffer. This frame buffer is used to store image content, more particularly pixels after processing through a graphics pipeline of a graphics processor.

In graphics processing, commands are provided to a graphic pipeline from an operating system, an application or other computer program to display an image on a screen of a display device. In the graphics pipeline, a raster operations processor receives image content such as geometry, texture and pixel information, and rasterizes this image content for storage in memory for subsequent display.

Conventionally, raster operations involve horizontally scanning an image (e.g. a character in a font set) line-by-line in order to provide pixel information for storage in a frame buffer. Accordingly, by horizontally scanning on a line-by-line basis, an image may be rasterized for storing in a frame buffer. This frame buffer stores image content in the same orientation as it is written to the memory. In other words, a memory is an array of memory cells, and a row of memory cells is associated with a horizontal scan line from raster operations. Pixels are read from the frame buffer and sent to a display in raster line order (i.e., "scan out"). Thus, raster lines are provided as horizontal rows for going across a display. Image content is provided to a display on a line-by-line basis with scanned out horizontal rows.

Figure 1A:
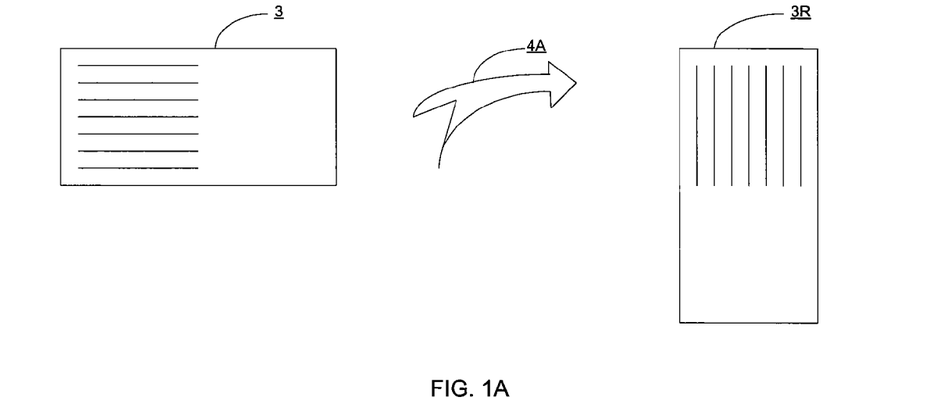
FIGS. 1A and 1B are process diagrams illustrating a document rotated from landscape mode to portrait mode.
Figure 1B:
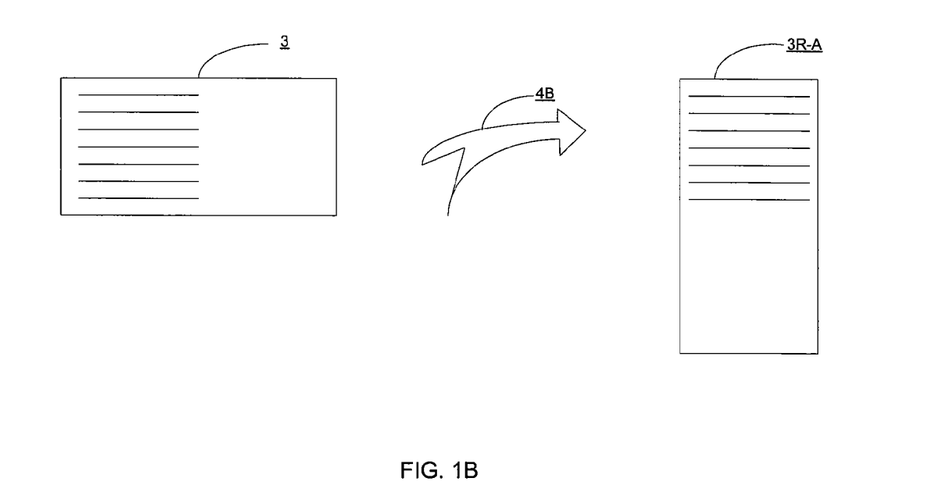

By having commonality between raster operations, memory storage and display image generation with respect to scanned horizontal information, a problem emerges when orientation of a display or display mode is altered, such as from landscape orientation to portrait orientation as illustratively shown in FIG. 1A. This is in part due to how frame buffer memory is accessed for scan out. Frame buffer memory is accessed with block reads from memory to read out a plurality of pixels at a time. Graphics processors are optimized to take advantage of block transfers to and from memory, and make implicit assumptions that raster lines are horizontal. However, raster lines are not horizontal when a display normally in landscape mode is rotated to portrait mode or otherwise flipped or rotated. In FIG. 1A, document 3 is shown prior to display screen rotation from landscape mode to portrait mode. After display screen rotation 4A, a rotated document 3R is shown. However, horizontal lines of document 3R are not properly oriented. A proper orientation is shown in FIG. 1B, where document 3 is shown after rotation 4B as a rotated and aligned document 3R-A.

Others have provided a mapping table as an intermediate step between obtaining a rasterized image and writing it to memory. However, this not only consumes additional resources to take physically unrotated content and transpose it to physically rotated content, but it is further undesirable as it consumes memory bandwidth. Additional memory bandwidth can be consumed due to performing block reads of multiple pixels for scanout, but using only one of the read pixel values due to scanning out one raster line at a time.

Accordingly, it would be desirable and useful to provide rotation of image content in a manner, which has less impact on memory bandwidth. Furthermore, it would be desirable and useful to provide image rotation without consuming any additional memory bandwidth than in conventional graphics processing.

SUMMARY OF THE INVENTION

An aspect of the invention is a graphics pipeline. The graphics pipeline comprises a transform engine configured to produce rotated image data in response to screen orientation.

Another aspect of the present invention is a process for rotating an image. At least one polygon is provided corresponding to at least part of the image. A transform engine is provided for rotating the at least one polygon responsive to orientation of a display. The texture is applied to the rotated polygon to produce a rotated image.

Another aspect of the present invention is an image-processing engine for processing a graphic image comprising a rotation transform configured to rotate the graphic image in response to screen orientation.

Another aspect of the present invention is a process for rotation of an image. The image is mapped as a texture having vertices associated with the image. The image is rendered with objects, and the objects are transformed into rotated objects. The rotated objects are textured with the texture into a rotated version of the image. The rotated version of the image is converted from three-dimensions to two-dimensions for display.

Another aspect of the present invention is an image engine. A rasterizer is coupled to memory for storing frame information and texture information. The texture information defined by an image is stored in the memory for rotation of the image in response to screen orientation.

Another aspect of the present invention is a method for batch process updating of a rotated image. A plurality of changes are stored as texture for the rotated image. The plurality of changes are rendered and rotated, and then the rendered and rotated plurality of changes are textured with the texture.

Another aspect of the present invention is a method for rotating and shifting an image. The image is stored as texture and then the image is transformed into at least one object. The at least one object is rotated. The at least one object rotated is shifted in response to an edge rule. The at least one object rotated is textured with the texture.

Another aspect of the present invention is a method for displaying data. A transform to a 3D graphics process is specified, where the transform is based partially on an alterable orientation of a display device. A set of pixels is received. A polygon is transferred to the 3D graphics process, where the polygon corresponds to the set of pixels at least some of which are used as a texture.

Another aspect of the present invention is an apparatus for displaying data, where a computer comprises a processor, a display, and a sensor coupled to the display and the processor. The sensor detects orientation of the display.

BRIEF DESCRIPTION OF THE DRAWINGS

So that the manner in which the above recited features of the present invention, and other features contemplated and claimed herein, are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2:
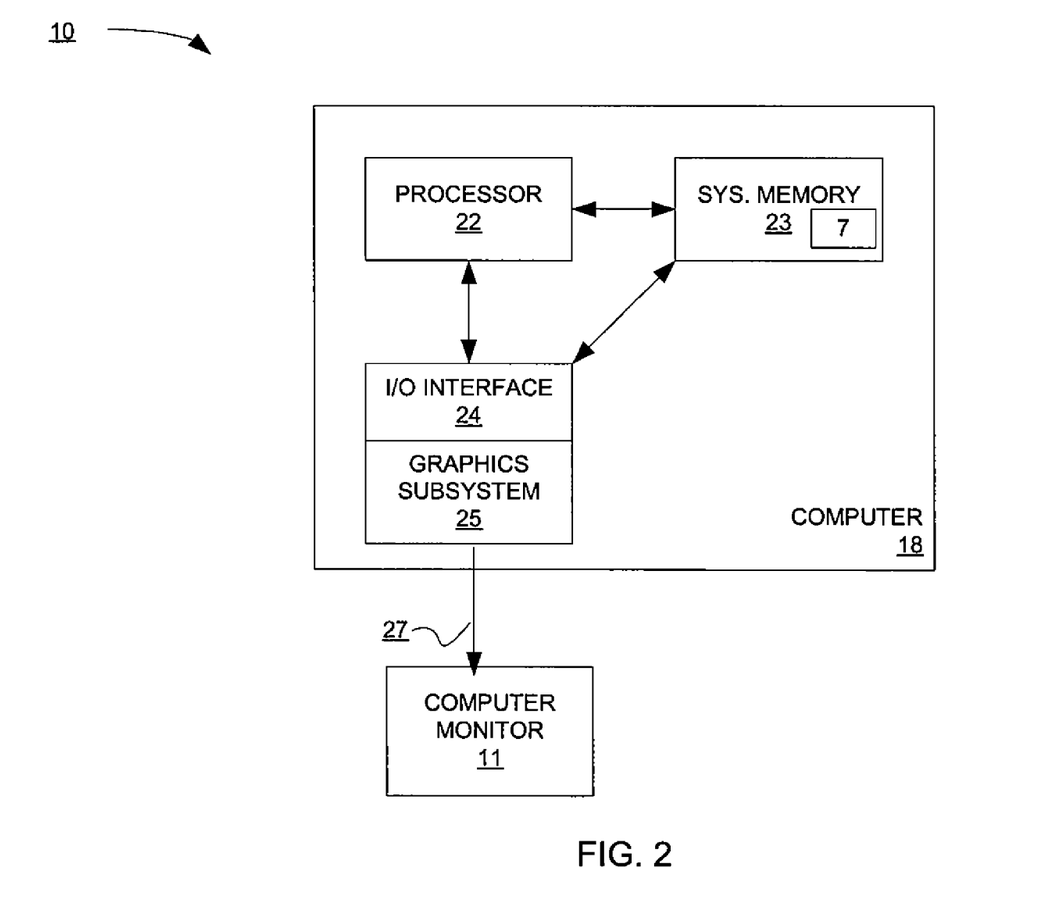
FIG. 2 is a block diagram of an exemplary portion of an embodiment of image display system in accordance with one or more aspects of the present invention.

FIG. 2 is a block diagram of an exemplary portion of an embodiment of image display system 10 in accordance with one or more aspects of the present invention. Computer 18 comprises processor 22, system memory 23, input/output (I/O) interface 24 and graphics subsystem 25. Processor 22 is coupled to system memory 23 and I/O interface 24. System memory 23 may be programmed with all or a portion of a driver program 7 for executing instructions in accordance with one or more aspects of the present invention as described below in more detail. The computer can be embodied as a desktop computer, a laptop computer, a handheld computer, a head-mounted computer, or a table computer.

Typically, computers do not use their 3D graphics capabilities to draw 2D objects onto the computer desktop or other draw surface. For example, if an application program wants to draw the letter "A" into its window, a 2D operation (e.g., a block transfer, or Bit) is done. Generally, if no 3D graphics application is running on the computer, the 3D graphics capabilities (or the majority of the capabilities) are idle. The present invention makes use of 3D graphics capabilities for 2D operations, thereby being able to compensate on-the-fly for changes in the orientation of the display screen.

I/O interface 24 may be coupled to system memory 23 for direct memory addressing (DMA). Though computer 18 may be programmed to carry out graphics oriented processing without a separate device for graphics processing, a more efficient use of processor 22 is to have a separate device for graphics processing. Accordingly, graphics system 25 may be coupled to I/O interface 24 in a known manner. Such graphics subsystems are well known, and often take the form of a "card." Moreover, in some instances, a graphics chip set is implemented on a motherboard, and thus no separate graphics card is used, or an optional separate graphics card can still be used, even if motherboard chips perform graphics functions. A key point is that no special circuitry for implementing one or more aspects of the present invention is needed. Rather, one or more aspects of the present invention may be implemented with "consumer off-the-shelf" (COTS) equipment. Graphics subsystem 25 provides an output 27 that is provided to computer monitor 11.

Figure 3:
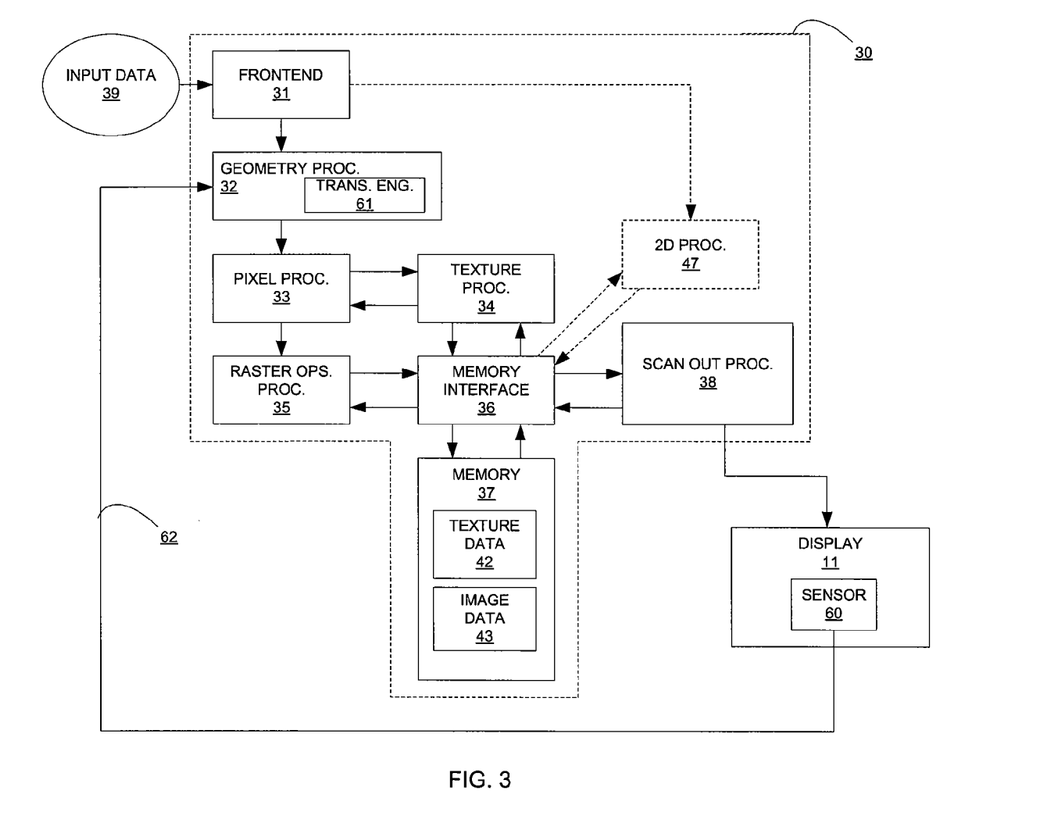
FIG. 3 is a block diagram of an exemplary embodiment of a graphics pipeline coupled to a display in accordance with one or more aspects of the present invention.

FIG. 3 is a block diagram of an exemplary embodiment of a graphics pipeline 30 coupled to a display 11 in accordance with one or more aspects of the present invention. Graphics pipeline 30 may be accessed by or an extension of an application program via an Application Program Interface (API), such as OpenGL®, Direct3D®, and DirectDraw®. For purposes of clarity, graphics pipeline 30 is described as implemented in hardware, though a combination of hardware and software may be used. Graphics pipeline comprises frontend 31, geometry processor 32, pixel processor 33, texture processor 34, raster operations processor 35, memory interface 36, memory or frame buffer 37, and scan out processor 38. Scan out processor 38 is coupled to display 11, such as a computer monitor. Optionally, a two-dimensional (2D) processor 47 may be coupled between frontend 31 and memory interface 36.

With continuing reference to FIG. 3, and renewed reference to FIG. 2, input information 39 is received from a host computer, such as computer 18, by a graphics pipeline 30 of graphics subsystem 25. That is, input information 39 is fed into the graphics pipeline, to produce an image 43 that is stored in memory 37. Input information 39 may be in response to a program application, an operating system or other computer program having an image to be displayed.

Input information 39 is provided to front end 31, which manages DMA, buffering commands and the like for geometry processor 32. Geometry processor 32 processes polygons and performs transforms, such as translation, scaling, rotation, field-of-view, and depth test near and far field clipping, among others, for such an image to be made. Pixel processor 33 associates data to pixels for such an image 43 to be made. The pixel processor 33 may be a programmable unit (e.g., a "programmable shader") that executes programs associated with pixels or sample locations within a graphics primitive.

Texture processor 34 generates texture values from texels stored as texture data 42, which texture data 42 can be stored in graphics subsystem memory 37, or system memory 23. Texture processor 34 performs interpolation, including but not limited to nearest, bilinear, trilinear and anisotropic interpolation amongst texels. Interpolation of texture coordinates, used to select texels for interpolation, includes plane equation and barycentric. Because some texel values are reused, texture processor 34 may cache texels to reduce repetitive reads from memory. Optionally, one or more coarser resolutions of image data 43 may be generated, for use in interpolation.

Raster operations processor 35 may blend, perform logic operations, and other known operations for such pixels. Memory interface 36 receives image data 43, in the form of pixel values and writes it to memory 37.

Though image data 43 may be output for display via memory interface 36 and scan out processor 38, as instructed by a host computer 18, other operations for adjusting image data may be done with instruction from host computer 18 or without instruction by host computer 18, namely, "behind" an application of host computer 18. Image data 43 can be the computer desktop (i.e., the main graphical user interface of the computer), which comprises one or more of: application program windows, icons, background image, video overlays, and any other type of data displayed on a computer screen.

Texture data 42 can be obtained from pre-rotation image data 43 and written to memory 37. Alternatively, image data 43 may be copied for creation of texture data 42. As another alternative, texture data can be received from the processor 22 or read from system memory 23. As previously described, generation of image data 43 comprises mapping of polygons, where each polygon has vertices. These vertices have corresponding texture coordinates, which correspond to locations in texture data 42. Accordingly, it should be appreciated that pre-rotation image data is stored as texture data 42. When locations of vertices of a polygon are moved for rotation, texture data 42 may be used to apply such texture to rotated vertices to produce a rotated version of image data 43, namely, post-rotation image data 43.

Input information 39, having a built in assumption of horizontal raster lines, is written to memory 37 as texture data 42. Such input information 39 may be from an application via a graphics API, as mentioned above. The input information may come from an application program or an operating system that does not know the orientation of the display device (or the plurality of display devices). In one embodiment, driver software associates the input information with a polygon (even if the application program or operating system did not associate the input information with a polygon), and specifies a transform to be applied to the polygon. When a change in the orientation of the display is detected, the driver can cause each application and/or the operating system to redraw the computer's desktop.

Figure 4A:
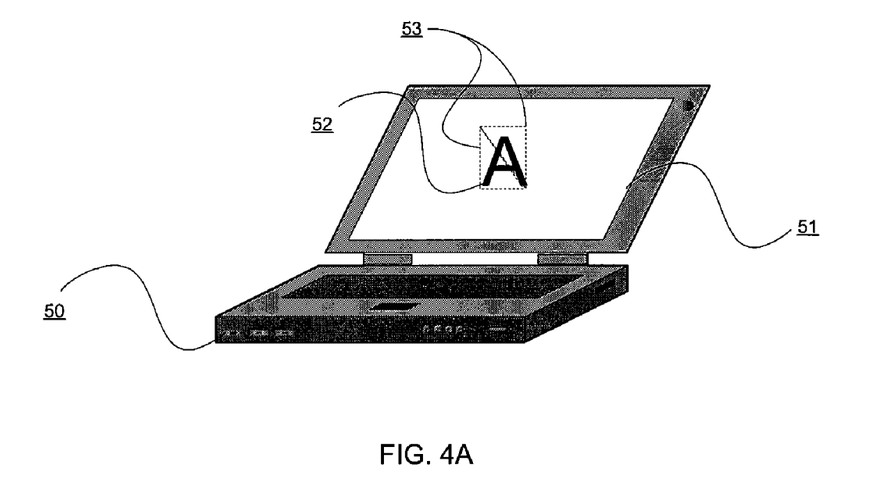
FIG. 4A is a three-dimensional perspective view of an exemplary embodiment of a notebook computer having a graphics subsystem in accordance with one or more aspects of the present invention.

Referring to FIG. 4A, there is shown a three-dimensional perspective view of an exemplary embodiment of a notebook computer 50 having a graphics subsystem 25 (shown in FIG. 2) in accordance with one or more aspects of the present invention. Notebook computer 50 comprises display screen 51. On display screen 51 is shown image content 52. For purposes of clarity of description, image content 52 is shown as the letter "A", though any image content 52 may be used. An application calls a graphics API to do a block transfer from memory 37 or system memory 23, and this API is used to put such image content, namely, this "A", into memory 37 as texture data 42. At least one polygon is put into graphics pipeline 30 to produce a rotated "A", and the rotated "A" is written to memory 37 as image data 43 which may be scanned out via scan out processor 38. For purposes of clarity, two polygons 53 are shown in phantom as they are not actually displayed but are used by geometry processor 32 as described below.

Thus, a rotation transform is performed by transform engine 61 of geometry processor 32. If rotation is about a point other than a central point of image content, such as a corner or other non-centered point, then a translation transform is added with a rotation transform to transform engine 61 of geometry processor 32. Hence, 2D image content to be displayed on display device 11 is treated as a 3D drawing, and thus such image content is processed through graphics pipeline 30. Transform engine 61 performs rotation, translation, scaling or any combination thereof to provide rotated image content for storage as post-rotation image data 43. Post-rotation image data 43 may then be scanned out in a conventional manner by scan out processor 38 via memory interface 36.

As mentioned above, rotation of image content may be done independently from an application program. For example in 3D graphics applications using a 3D graphics pipeline, or a 2D transformation for that matter, a matrix or matrices used by transform engine 61 are modified to rotate, translate, scale or any combination thereof, to provide image data 43 with an orientation independent of such an application program. Such an application program would not have to be informed of such a rotation operation, translation operation or scaling operation, or any combination thereof.

Figure 4B:
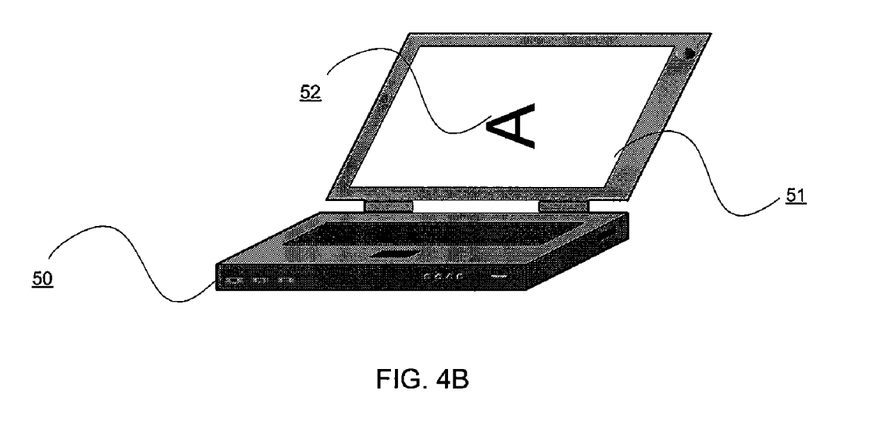
FIGS. 4B, 4C and 4D are three-dimensional perspective views of the notebook computer of FIG. 4A with a displayed image rotated in accordance with one or more aspects of the present invention.
Figure 4C:
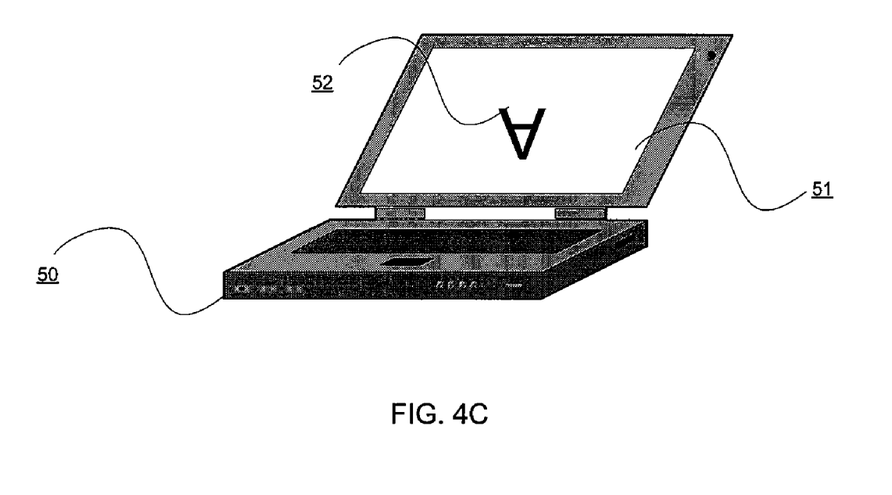
Figure 4D:
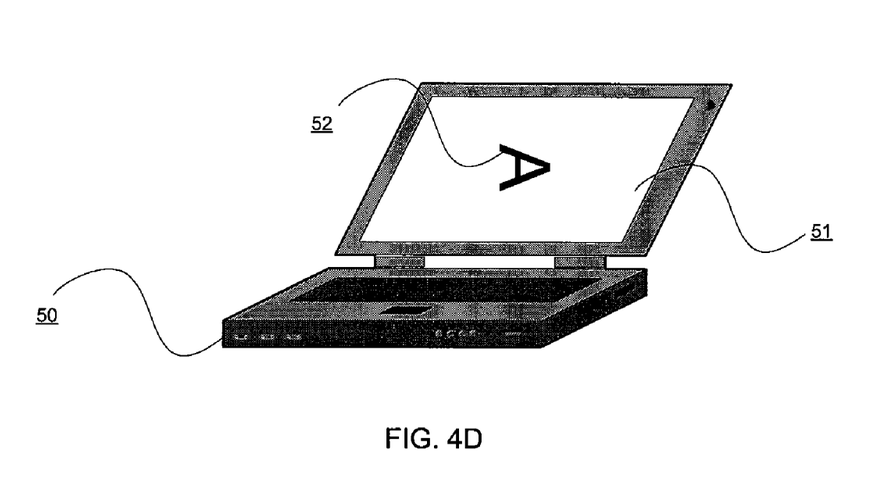

Notably, rotation may be user selectable, such as shown in FIGS. 4B, 4C and 4D. For example, in the three-dimensional perspective view of FIG. 4B of an exemplary embodiment of a notebook computer 50 having a graphics pipeline 30 (shown in FIG. 3), there is shown a user selected to rotate the screen display orientation for viewing by a person on such a user's left. For example, in the three-dimensional perspective view of FIG. 4C of an exemplary embodiment of a notebook computer 50 having a graphics pipeline 30 (shown in FIG. 3), there is shown a user selected to rotate or flip the screen display orientation for viewing by a person facing such a user. For example, in the three-dimensional perspective view of an exemplary embodiment of a notebook computer 50 having a graphics pipeline 30 (shown in FIG. 3) of FIG. 4D, a user selected to rotate the screen display orientation for viewing by a person on such a user's right.

Figure 5:
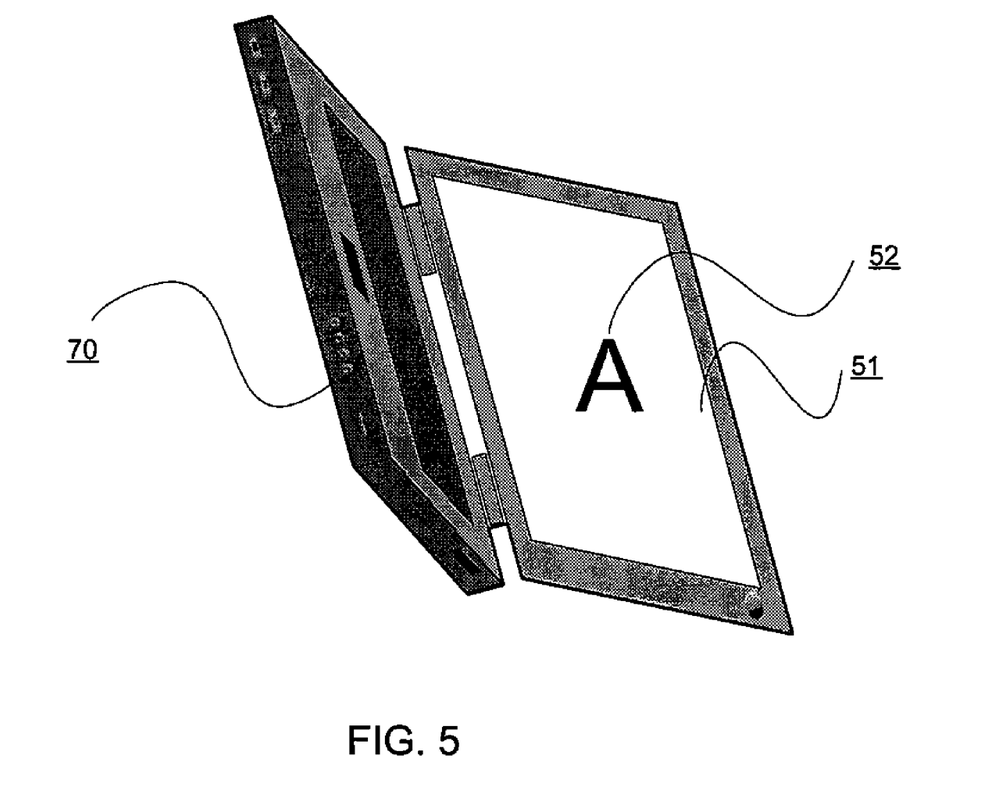
FIG. 5 is a three-dimensional perspective view of a notebook computer having a sensor in accordance with one or more aspects of the present invention configured to sense rotation for rotating a displayed image in accordance with one or more aspects of the present invention.

Alternatively or in addition to user selection, a sensor 60 may be coupled to display 11 or other part of notebook 50, where rotation of display 11 is sensed. Sensed rotation by sensor 60 may be transduced into a sensed rotation signal 62. Sensed rotation signal 62 may be provided to geometry processor 32 to generate a rotation transform responsive to sensed rotation, or more particularly responsive to sensed rotation signal 62. The sensed rotation signal may be supplied to processor 22 via input output operations, and used by the driver software to set the transform. For example, in FIG. 5 there is shown a three-dimensional perspective view of a notebook 70 having a sensor 60 (shown in FIG. 3) in accordance with one or more aspects of the present invention. When notebook 70 is rotated, image content 52 on display screen 51 rotates in response to rotation of notebook 70. Alternatively, sensor 60 may be configured to sense rotation in a step-wise manner, for example signal 62 would change displayed content when rotation of display 11 was approximately 90, 180, or 270 degrees.

As mentioned above, transforming for rotation of an image may be part of a 3D graphics API, accessible by a 3D graphics API, or hidden from an application program or operating system. However, other implementations may be used with or without an API. For example, a batch process for updating a rotated image or "rotated frame buffer" may be used. Due to overhead used to configure a 3D graphics pipeline to perform the above-described transform(s), a set of operations may be buffered to go through such a configured 3D graphics pipeline so that overhead may be distributed among a plurality of changes or updates. For example, suppose a text document has been rotated as described above, and changes need to be made to such text document. Rather than rotating each individual change as processed through a 3D graphics pipeline, changes are buffered and saved as texture. Then, a plurality of changes may be rendered together. The rendered changes may then be rotated, and the rotated rendered changes may then be textured with such saved or stored texture for such plurality of changes. For example, a 2D graphics application (e.g., a web browser or word processor) may be running along with a 3D graphics application (e.g., a game program). It is undesirable to interrupt 3D graphics processing whenever a 2D operation (e.g., writing a single character) is done, because, the graphics pipeline 30 is generally highly optimized to keep all its processing capability in use, and changing context from the 3D application to the 2D application causes idle cycles (called "bubbles") in the graphics pipeline.

Another implementation may be an offset shift process to conform to one or more edge rules. After rotation, a rotated polygon may not comply with an edge rule. To bring into compliance, a rotated image may be slightly shifted, for example a predetermined fixed amount depending on accuracy of rasterizer used.

While foregoing is directed to the preferred embodiment of the present invention, other and further embodiments of the invention may be devised without departing from the basic scope thereof, and the scope thereof is determined by the claims that follow. All trademarks are the respective property of their owners. Claims listing steps do not imply any order of the steps.

The invention claimed is:

1. A computer system, comprising:
a display device;
a host processor;
a sensor coupled to the display device and to the host processor, wherein the sensor is configured to detect a first orientation of the display device,
a memory storing driver software configured to:
receive input information that comprises two-dimensional (2D) image content from the host processor,
associate the 2D image content with one or more three-dimensional (3D) polygons having vertex data, and
specify a first transform to be applied to the one or more polygons, wherein the first transform is based at least partially on the first orientation of the display device; and
a 3D graphics subsystem configured to receive the 2D image content and the vertex data, the 3D graphics subsystem comprising:
a geometry processor configured to receive the vertex data, wherein the vertex data includes a first location for a first vertex of a polygon and a first location for a second vertex for the polygon,
a transform engine residing within the geometry processor and configured to produce a rotated second location for the first vertex and a rotated second location for the second vertex using the first transform,
a graphics memory,
a memory interface coupled to the graphics memory and configured to:
store the 2D image content as texture data in the graphics memory, and
store 3D rotated image data comprising one or more rotated polygons in the graphics memory, and
a texture processor configured to apply the texture data to the first vertex at the rotated second location and the second vertex at the rotated second location to produce primitives comprising the 3D rotated image data;
wherein the computer system comprises a tablet computer system.

2. The computer system of claim 1, wherein the sensor is further configured to provide a signal in response to detecting the first orientation.

3. The computer system of claim 2, wherein the transform engine is further configured to receive the signal provided by the sensor, and to produce the rotated second location for the first vertex in response to the signal.

4. The computer system of claim 3, wherein the first orientation of the display is selected from the following approximate rotations of 90°, 180° and 270°.

5. The computer system of claim 1, wherein the first location for the first vertex and the rotated second location for the first vertex are both within a plane of the display.

6. The computer system of claim 5, wherein the first orientation of the display is approximately a 90° rotation.

7. The computer system of claim 5, wherein the first orientation of the display is approximately a 180° rotation.

8. The computer system of claim 5, wherein the first orientation of the display is approximately a 270° rotation.

9. The computer system of claim 1, wherein the 3D rotated image data is in response to a portrait mode for the orientation of the display.

10. The computer system of claim 1, wherein the 3D rotated image data is rotated about an image center.

11. The computer system of claim 1, wherein the 3D rotated image data is rotated about an image corner.

* * * * *

UNITED STATES PATENT AND TRADEMARK OFFICE
CERTIFICATE OF CORRECTION

PATENT NO. : 7,593,025 B1 Page 1 of 1
APPLICATION NO. : 11/952994
DATED : September 22, 2009
INVENTOR(S) : Abraham B. De Waal It is certified that error appears in the above-identified patent and that said Letters Patent is hereby corrected as shown below:

In column 7, line 31, please replace "display device," with -- display device; --.

Signed and Sealed this

Ninth Day of March, 2010

David J. Kappos
*Director of the United States Patent and Trademark Office*